(12) United States Patent
Yana

(10) Patent No.: US 10,956,109 B2
(45) Date of Patent: Mar. 23, 2021

(54) IMAGE FORMING SYSTEM INCLUDING PLURAL IMAGE FORMING APPARATUSES CONNECTED VIA NETWORK

(71) Applicant: KYOCERA Document Solutions Inc., Osaka (JP)

(72) Inventor: Regil Yana, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/865,689

(22) Filed: May 4, 2020

(65) Prior Publication Data

US 2020/0364017 A1 Nov. 19, 2020

(30) Foreign Application Priority Data

May 13, 2019 (JP) .............................. JP2019-090737

(51) Int. Cl.
*G06F 3/12* (2006.01)
*H04N 1/00* (2006.01)

(52) U.S. Cl.
CPC ....... *G06F 3/1296* (2013.01); *H04N 1/00244* (2013.01)

(58) Field of Classification Search
CPC ..................................................... G06F 3/1296
USPC ....................................................... 358/1.15
See application file for complete search history.

(56) References Cited

U.S. PATENT DOCUMENTS

| | | | | |
|---|---|---|---|---|
| 8,228,533 | B2* | 7/2012 | Kajiyama | ......... H04N 1/32101 358/1.15 |
| 2005/0197967 | A1* | 9/2005 | Booth | ................... G06F 21/608 705/62 |
| 2008/0117453 | A1 | 5/2008 | Toda | |
| 2009/0153895 | A1* | 6/2009 | Hibino | .................. G06F 21/608 358/1.14 |
| 2011/0205558 | A1* | 8/2011 | Nakajima | ............. G06F 3/1291 358/1.2 |
| 2012/0057201 | A1* | 3/2012 | Tsukamoto | ........... G06F 3/1291 358/1.15 |
| 2013/0246823 | A1* | 9/2013 | Imaizumi | ............. G06F 1/3284 713/323 |

(Continued)

FOREIGN PATENT DOCUMENTS

JP 2008-129353 A 6/2008

*Primary Examiner* — Jerome Grant, II
(74) *Attorney, Agent, or Firm* — IP Business Solutions, LLC

(57) ABSTRACT

An image forming system includes a first image forming apparatus and a second image forming apparatus. The first image forming apparatus includes a register and a first custom box. The register registers a share program for executing particular processing. The first custom box stores a job transmitted from the second image forming apparatus. The second image forming apparatus includes a communication device and a remote instructor. The communication device transmits the job to the first custom box of the first image forming apparatus. The remote instructor gives an instruction to the first image forming apparatus to start processing based on the share program. The first image forming apparatus includes a processing executor. Upon receipt of the instruction to start processing from the remote instructor, the processing executor executes the particular processing based on the share program on the job stored in the first custom box.

7 Claims, 14 Drawing Sheets

(56) References Cited

U.S. PATENT DOCUMENTS

2016/0352960 A1\* 12/2016 Morita ............... H04N 1/00344
2017/0017445 A1\* 1/2017 Ishizu ................ H04N 1/00408

\* cited by examiner

Fig.5A  <FIRST IMAGE FORMING APPARATUS>
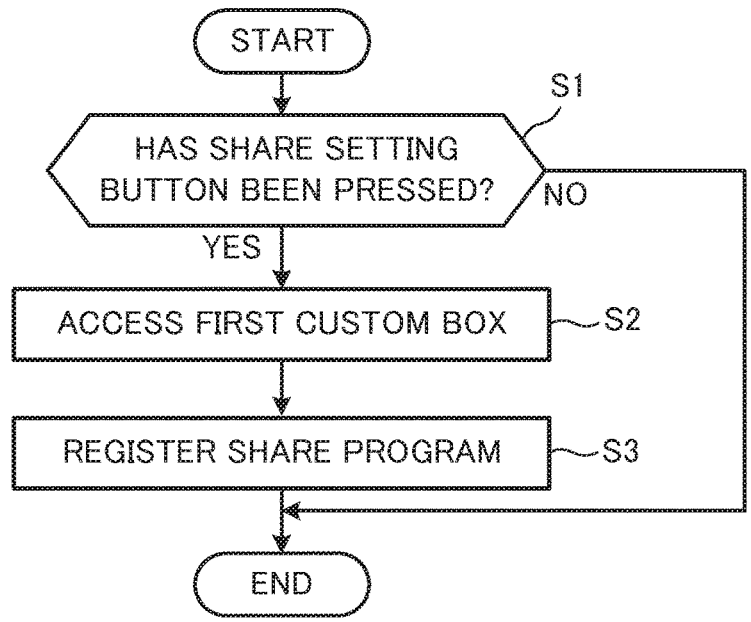
Fig.5B  <FIRST IMAGE FORMING APPARATUS>
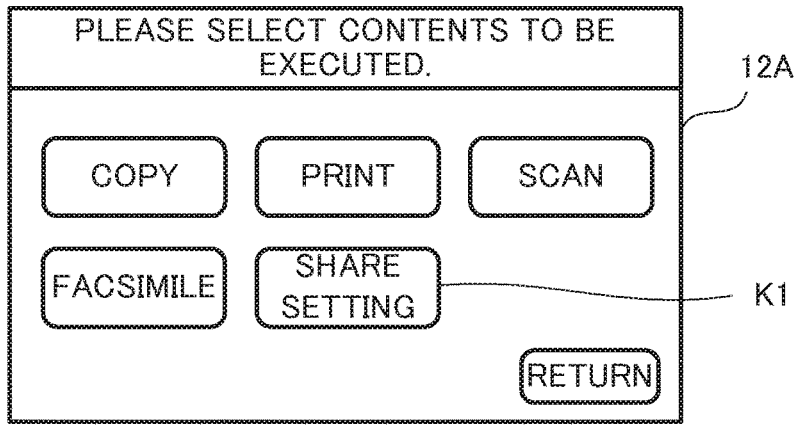
Fig.5C  <FIRST IMAGE FORMING APPARATUS>
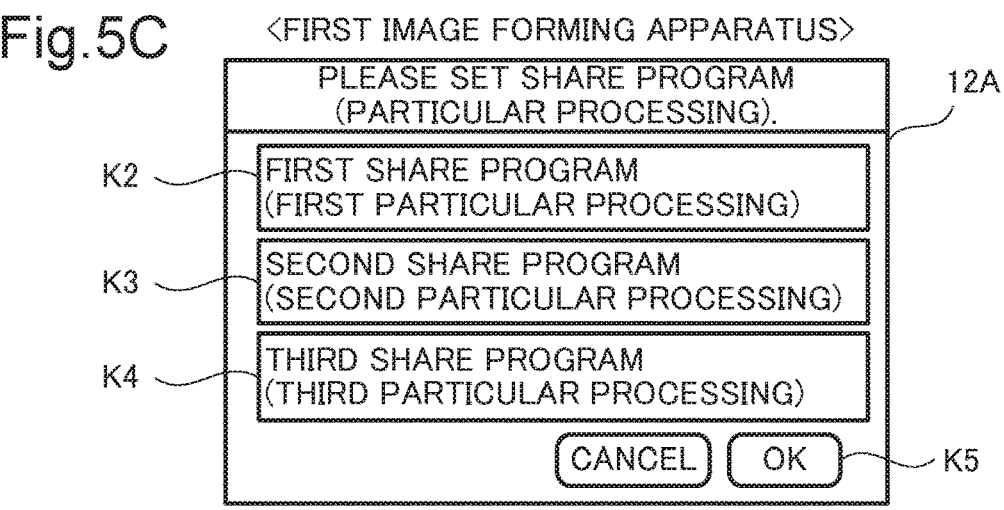

Fig.6A <SECOND IMAGE FORMING APPARATUS>
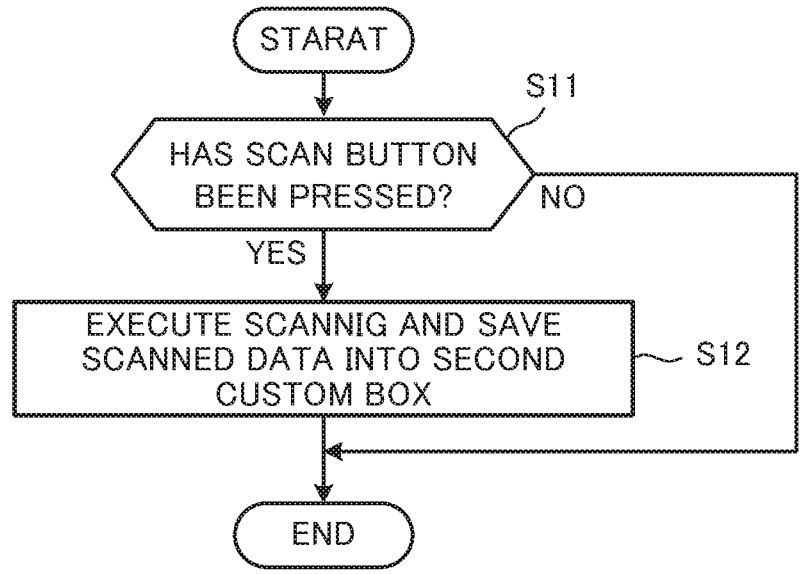
Fig.6B <SECOND IMAGE FORMING APPARATUS>
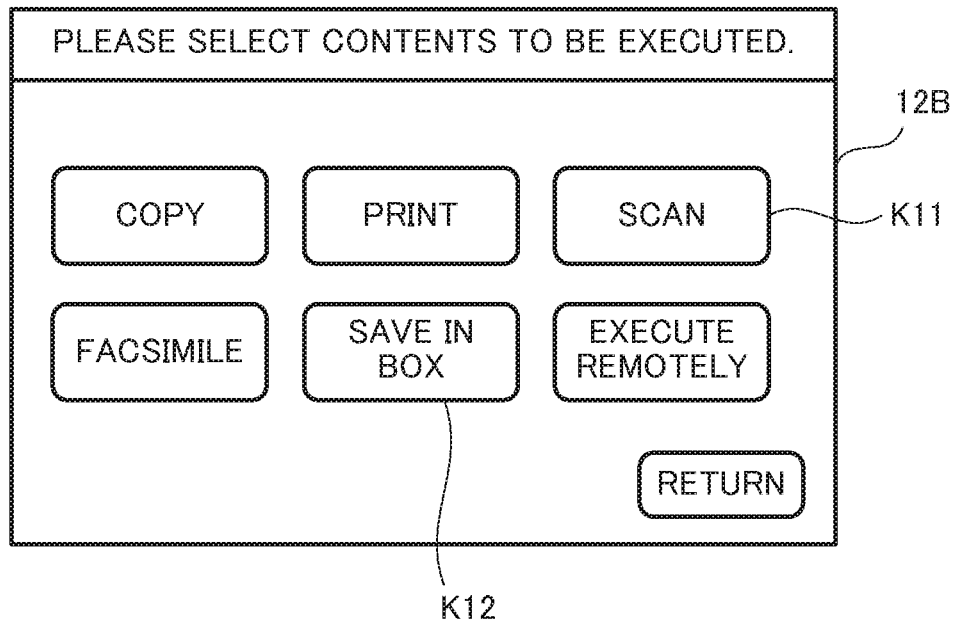

Fig.8A

<SECOND IMAGE FORMING APPARATUS>

PLEASE SELECT DESTINATION.

| APPARATUS LIST | IP ADDRESS |
|---|---|
| FIRST IMAGE FORMING APPARATUS | 10.19X.15X.XX |
| SECOND IMAGE FORMING APPARATUS | 10.19X.15X.XY |
| THIRD IMAGE FORMING APPARATUS | 10.19X.15X.XZ |

CANCEL  OK

<SECOND IMAGE FORMING APPARATUS>

PLEASE SELECT CUSTOM BOX OF FIRST IMAGE FORMING APPARATUS.

FIRST CUSTOM BOX

ANOTHER CUSTOM BOX

CANCEL  SEND

<SECOND IMAGE FORMING APPARATUS>

PLEASE SELECT CONTENTS TO BE EXECUTED.

| COPY | PRINT | SCAN |
|---|---|---|
| FACSIMILE | SAVE IN BOX | EXECUTE REMOTELY |

RETURN

<SECOND IMAGE FORMING APPARATUS>

PLEASE SELECT REMOTELY OPERABLE APPARATUS.

| APPARATUS LIST | IP ADDRESS |
|---|---|
| FIRST IMAGE FORMING APPARATUS | 10.19X.15X.XX |
| SECOND IMAGE FORMING APPARATUS | 10.19X.15X.XY |
| THIRD IMAGE FORMING APPARATUS | 10.19X.15X.XZ |

CANCEL    OK

<SECOND IMAGE FORMING APPARATUS>

PLEASE SELECT PARTICULAR PROCESSING.

| PARTICULAR PROCESSING LIST |
|---|
| FIRST PARTICULAR PROCESSING |
| SECOND PARTICULAR PROCESSING |
| THIRD PARTICULAR PROCESSING |

K24 — FIRST PARTICULAR PROCESSING

12B

CANCEL  OK

<SECOND IMAGE FORMING APPARATUS>

PLEASE SELECT DESTINATION TO STORE.

| APPARATUS LIST | IP ADDRESS |
|---|---|
| FIRST IMAGE FORMING APPARATUS | 10.19X.15X.XX |
| SECOND IMAGE FORMING APPARATUS | 10.19X.15X.XY |
| THIRD IMAGE FORMING APPARATUS | 10.19X.15X.XZ |

K26

12B

CANCEL  OK

K27

IMAGE FORMING SYSTEM INCLUDING PLURAL IMAGE FORMING APPARATUSES CONNECTED VIA NETWORK

INCORPORATION BY REFERENCE

This application claims priority to Japanese Patent Application No. 2019-090737 filed on May 13, 2019, the entire contents of which are incorporated by reference herein.

BACKGROUND

The present disclosure relates to image forming systems and particularly relates to a technique in which, in an image forming system where a plurality of image forming apparatuses including higher-level and lower-level ones are connected via a network, a performance or function possessed by the higher-level apparatus only is utilized by the lower-level apparatus.

Some image forming systems including a plurality of image forming apparatuses connected via a network perform parallel printing. For example, in a general image forming system, a plurality of image forming apparatuses having parallel printing function (for example, which is composed of a single master apparatus and two slave apparatuses) are connected via a network and the three apparatuses can concurrently do printing in such a manner that the master apparatus shares a single copy job accepted by itself with the two slave apparatuses. When the single copy job accepted by the master apparatus is, for example, a job of printing nine copies of an original document, each of the three apparatuses prints three copies. Thus, the copying efficiency is increased and, particularly during mass copying, the operation time can be significantly reduced.

SUMMARY

A technique improved over the aforementioned technique is proposed as one aspect of the present disclosure.

An image forming system according to an aspect of the present disclosure includes a plurality of image forming apparatuses connected via a network. The plurality of image forming apparatuses include a first image forming apparatus capable of executing particular processing and a second image forming apparatus incapable of executing the particular processing. The first image forming apparatus includes a first custom box and a first control device. The first custom box stores a job transmitted from the second image forming apparatus. The first control device includes a processor and functions, through the processor executing a first control program, as a register. The register registers a program for executing the particular processing as a share program. The second image forming apparatus includes an operation device, a transmitter, and a second control device. The transmitter transmits, according to a user's operation on the operation device, the job to the first custom box of the first image forming apparatus. The second control device includes a processor and functions, through the processor executing a second control program, as a remote instructor. The remote instructor gives, according to a user's operation on the operation device, an instruction to the first image forming apparatus to start processing based on the share program. The first control device of the first image forming apparatus further functions, through the processor executing the first control program, as a processing executor. Upon receipt of the instruction to start processing from the remote instructor, the processing executor executes the particular processing based on the share program on the job stored in the first custom box.

BRIEF DESCRIPTION OF THE DRAWINGS

FIG. 5A is a flowchart showing an example of processing for registering a share program on the first image forming apparatus.

FIG. 5B is a view showing an example of a display screen on a display device of the first image forming apparatus.

FIG. 5C is a view showing another example of a display screen on the display device of the first image forming apparatus.

FIG. 6A is a flowchart showing an example of scanning processing on the second image forming apparatus.

FIG. 6B is a view showing an example of a display screen on a display device of the second image forming apparatus.

FIG. 8A is a view showing an example of a display screen on the display device of the second image forming apparatus.

FIG. 8B is a view showing another example of a display screen on the display device of the second image forming apparatus.

FIG. 10A is a view showing an example of a display screen on the display device of the second image forming apparatus.

FIG. 10B is a view showing another example of a display screen on the display device of the second image forming apparatus.

FIG. 11A is a view showing an example of a display screen on the display device of the second image forming apparatus.

FIG. 11B is a view showing another example of a display screen on the display device of the second image forming apparatus.

DETAILED DESCRIPTION

Figure 1:
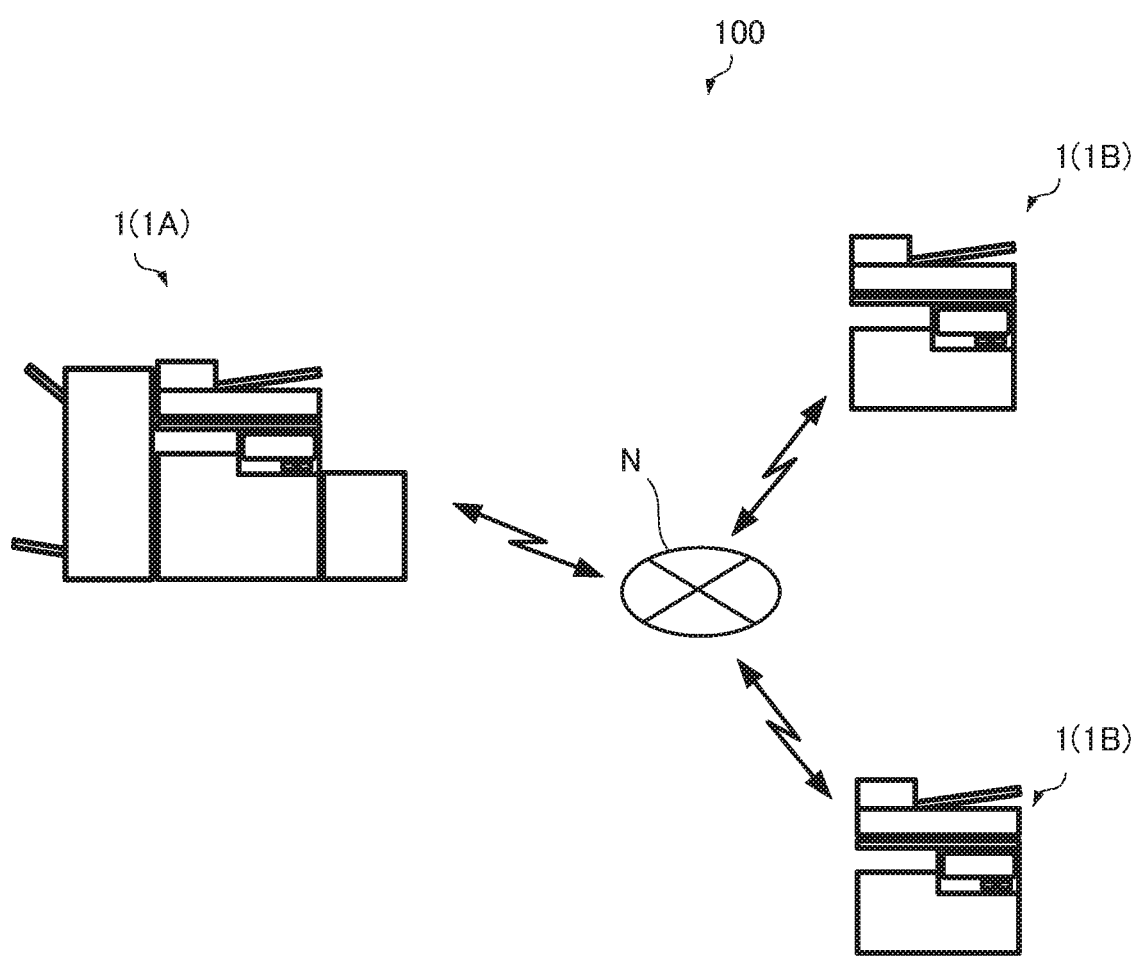
FIG. 1 is a diagram showing an image forming system according to a first embodiment of the present disclosure.

Hereinafter, a description will be given of an image forming system according to embodiments of the present disclosure with reference to the drawings. FIG. 1 is a diagram showing an image forming system according to a first embodiment of the present disclosure. An image forming system 100 according to the first embodiment includes, as shown in FIG. 1, a plurality of (for example, three) image forming apparatuses 1 connected via a network N.

One of the three image forming apparatuses 1 is a first image forming apparatus 1A which is of high-end model (a higher-level apparatus) capable of executing particular processing, and the remaining two are second image forming apparatuses 1B which are of low-end model (lower-level apparatuses) incapable of executing the particular processing. Although the image forming system 100 according to the first embodiment includes three image forming apparatuses 1, it is sufficient for the image forming system according to the present disclosure to include a single first image forming apparatus 1A and a single second image forming apparatus 1B.

Figure 2:
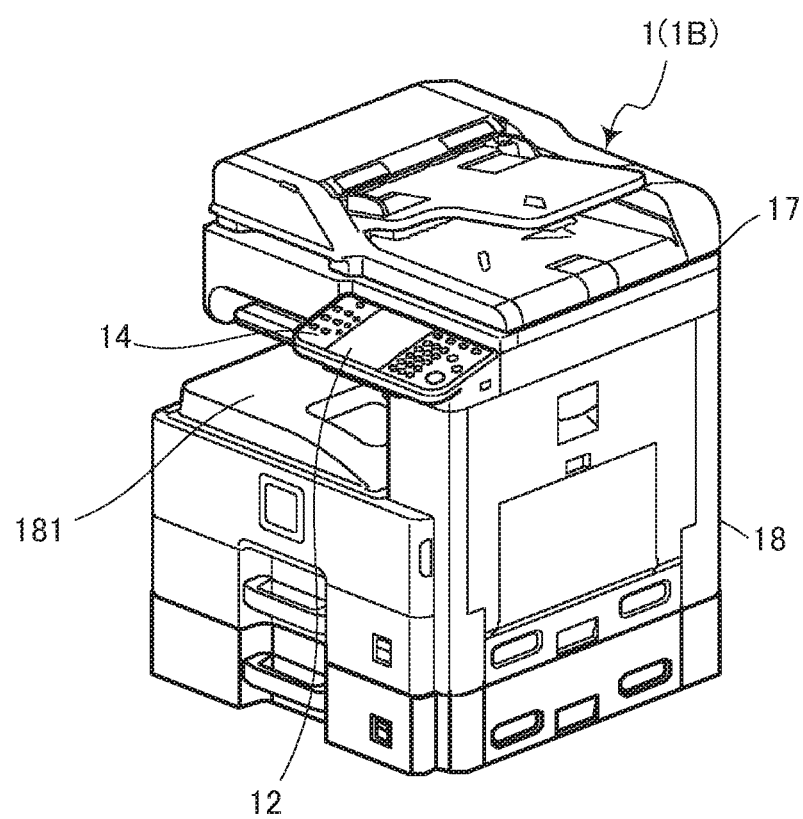
FIG. 2 is a perspective view of a second image forming apparatus according to the first embodiment of the present disclosure.
Figure 3:
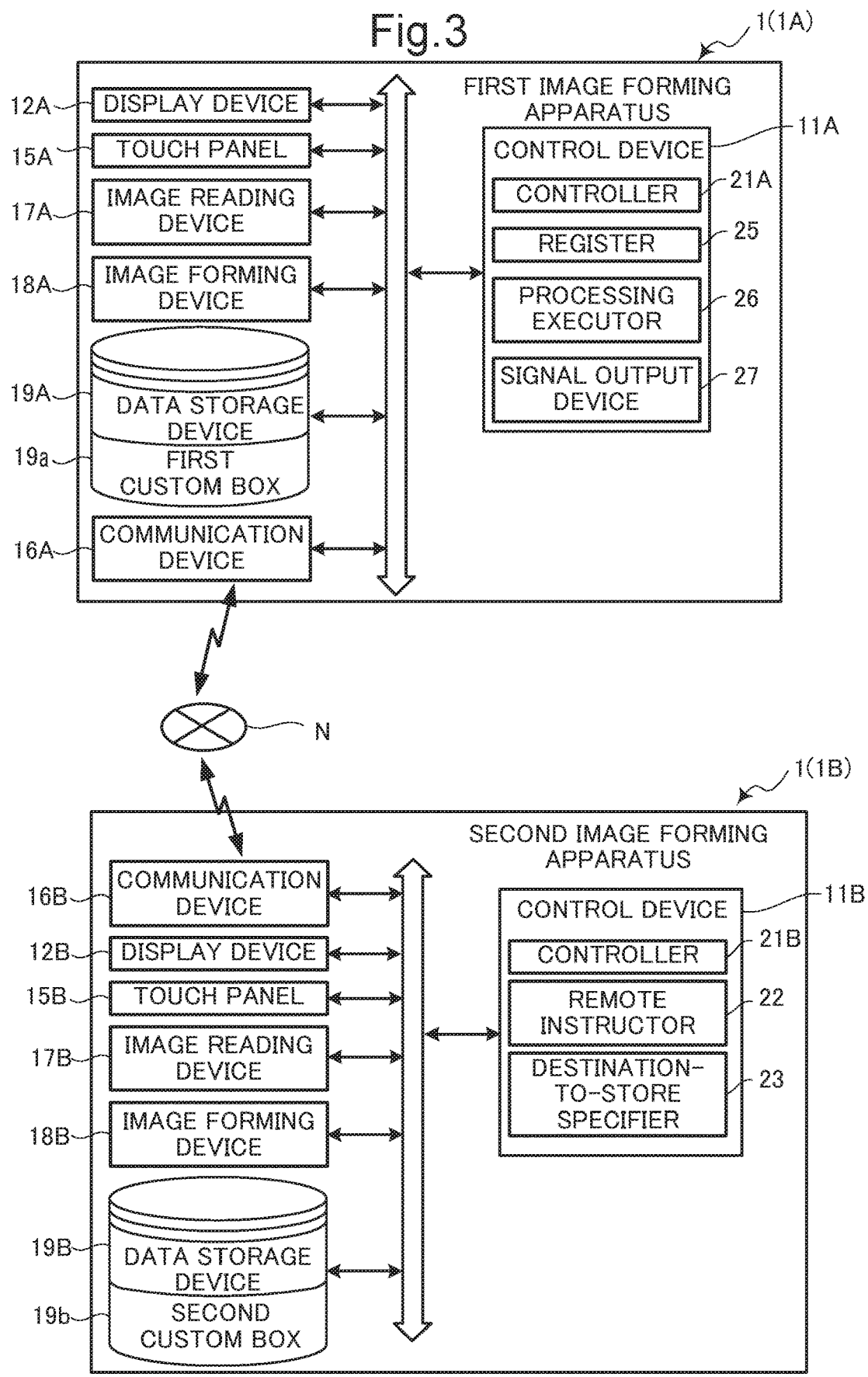
FIG. 3 is a block diagram showing the configuration of the image forming system according to the first embodiment.

The second image forming apparatus 1B according to the first embodiment of the present disclosure is, for example, a multifunction peripheral (MFP) having multiple functions, including a copy function, a print function, a scan function, and a facsimile function. The second image forming apparatus 1B will be described below with reference to FIGS. 2 and 3. FIG. 2 is a perspective view of the second image forming apparatus according to the first embodiment of the present disclosure. FIG. 3 is a block diagram showing the configuration of the image forming system according to the first embodiment.

The second image forming apparatus 1B according to the first embodiment includes a control device 11B (second control device), a display device 12B, a touch panel 15B, a communication device 16B, an image reading device 17B, an image forming device 18B, and a data storage device 19B. These components are capable of data or signal transfer via a bus among them.

The image reading device 17B is, for example, a CCD (charge coupled device) serving as a scanner for optically reading an original document and has the function of generating image data representing an image of the original document. The image reading device 17B is a general reader for reading an original document being conveyed by an auto document feeder or an original document placed on a flatbed.

The image forming device 18B uniformly charges the surface of each photosensitive drum, exposes the surface of the photosensitive drum to form an electrostatic latent image on the surface of the photosensitive drum, develops the electrostatic latent image into a toner image, transfers the toner image (the image) on the surface of the photosensitive drum to a recording paper sheet, and fixes the toner image on the recording paper sheet. For example, the image forming device 18B prints on the recording paper sheet a document image obtained by reading of the original document by the image reading device 17B.

The display device 12B is a display device, for example, such as a liquid crystal display (LCD) or an organic EL (organic light-emitting diode (OLED)) display.

The touch panel 15B is disposed on the front of the display screen of the display device 12B. The touch panel 15B detects a user's touch gesture on a button or key displayed on the display screen of the display device 12B and outputs a detection signal indicating detection of the touch gesture to a below-described controller 21B. Thus, the user can operate the image forming apparatus 1B with the touch of the display device 12B. The display device 12B and the touch panel 15B are examples of an operation device defined in What is claimed is.

The communication device 16B is a communication interface including a communication module and has the function of sending and receiving data to and from an unshown external device (for example, a personal computer, a server or a mobile information terminal) via the network N formed of a LAN (local area network), a public line or the like. Furthermore, the communication device 16B transmits, according to a user's touch gesture on the display device 12B (user's operation on the operation device), a job to a below-described first custom box of the first image forming apparatus 1A. The communication device 16B is an example of a transmitter defined in What is claimed is.

The data storage device 19B is a large storage device, such as an HDD (hard disk drive). The data storage device 19B stores image data representing the image of the original document obtained by reading of the original document by the image reading device 17B. The data storage device 19B includes a second custom box 19$b$ capable of storing a job. Specifically, the second custom box 19$b$ is capable of storing image data (i.e., scanned data) representing the image of the original document read by the image reading device 17B.

The control device 11B is formed of a processor, a RAM (random access memory), a ROM (read only memory), and so on. The processor is, for example, a CPU (central processing unit), an MPU or an ASIC. When a second control program stored in the data storage device 19B is executed by the above processor, the control device 11B functions as a controller 21B, a remote instructor 22, and a destination-to-store specifier 23. Alternatively, each of the controller 21B, the remote instructor 22, and the destination-to-store specifier 23 of the control device 11B may not be implemented by the operation of the control device 11B in accordance with the above second control program but may be constituted by a hardware circuit.

The controller 21B governs the overall operation control of the second image forming apparatus 1B.

When the touch panel 15B detects a user's operation for printing instruction, the controller 21B allows the image forming device 18B to form on a recording paper sheet an image represented by image data generated by a below-described processing executor 26. Alternatively, when the touch panel 15B detects a user's operation for data output instruction, the controller 21B allows the communication device 16B to transmit (output) the image data generated by the processing executor 26 to an unshown external device, such as a computer.

The remote instructor 22 gives, according to a user's touch gesture on the display device 12B, an instruction to the first image forming apparatus 1A to start processing based on a share program.

The destination-to-store specifier 23 specifies, according to a user's touch gesture on the display device 12B, the first custom box 19$a$ of the first image forming apparatus 1A or the second custom box 19$b$ of the second image forming apparatus 1B as a destination to store the job on which the below-described processing executor 26 of the first image forming apparatus 1A has executed the particular processing.

When the job on which the processing executor 26 of the first image forming apparatus 1A has executed the particular processing is stored in the second custom box 19b of the second image forming apparatus 1B as a destination to store specified by the destination-to-store specifier 23, the display device 12B displays (indicates) that the job is stored in the second custom box 19b. The display device 12B is an example of an indicator defined in What is claimed is.

A description will be given below of the configuration of the first image forming apparatus 1A. The first image forming apparatus 1A is a higher-level apparatus, is different from the second image forming apparatuses 1B, which are lower-level apparatuses, in that it can execute the particular processing not possessed by the second image forming apparatuses 1B, and, as for the rest, has the same configuration as the second image forming apparatuses 1B. Specifically, the first image forming apparatus 1A is different from the second image forming apparatus 1B in that it includes a register 25, a processing executor 26, and a signal output device 27, and does not include the remote instructor 22 and destination-to-store specifier 23 included in the second image forming apparatus 1B. Note that the first image forming apparatus 1A includes a display device 12A, a touch panel 15A, a communication device 16A, an image reading device 17A, and an image forming device 18A, but these components have the same configurations as those in the second image forming apparatus 1B and a detailed description thereof will therefore be not given below.

The control device 11A (first control device) of the first image forming apparatus 1A is formed of a processor, a RAM (random access memory), a ROM (read only memory), and so on. The processor is, for example, a CPU (central processing unit), an MPU or an ASIC. When a first control program stored in the data storage device 19A is executed by the above processor, the control device 11A functions as a controller 21A, the register 25, the processing executor 25, and the signal output device 27. Alternatively, each of the controller 21A, the register 25, the processing executor 26, and the signal output device 27 of the control device 11A may not be implemented by the operation of the control device 11A in accordance with the above first control program but may be constituted by a hardware circuit.

The register 25 registers, according to a user's touch gesture on the display device 12A, a program for executing the particular processing as a share program with the first custom box 19a.

The first custom box 19a of the data storage device 19A stores a job transmitted from the second image forming apparatus 1B.

Upon receipt of the instruction to start processing from the remote instructor 22 of the second image forming apparatus 1B, the processing executor 26 executes, on the job stored in the first custom box 19a, the particular processing based on the share program.

Examples of the particular processing include first particular processing, second particular processing, and third particular processing. For example, the first particular processing includes: image analysis processing for subjecting the image data on the job stored in the first custom box 19a to a predetermined image analysis; and file name setting processing for setting, for the image data on the job, a file name according to a result of the image analysis processing. The register 25 registers the program for executing the image analysis processing and the file name setting processing as a share program. In other words, the register 25 registers the program for executing the first particular processing as a share program.

The second particular processing includes processing for controlling image quality with high precision. The third particular processing includes processing for providing a teaching assistant function, i.e., a help function.

When the particular processing includes the image analysis processing and the file name setting processing, the processing executor 26 of the first image forming apparatus 1A executes the image analysis processing and the file name setting processing.

Specifically, the processing executor 26 executes: image analysis processing based on a function of converting a character image contained in the image data to text data (character data) character by character using a known OCR (optical character recognition) technique and a function of recognizing a picture image contained in the image data (for example, if a picture of an apple is depicted, the processing executor 26 identifies that the picture is an apple) using a known pattern matching technique; and file name setting processing for setting a file name according to the result of the image analysis processing. More specifically, when the result of the image analysis processing shows that the content of the image data is a text describing an apple or apples (the text data extracted from the image data has a head title containing "apple", the text data contains the description that "apple will be described", or the most frequently appearing noun in the text data is "apple") or the image data is a picture of an apple or apples, file name setting processing is executed for setting the file name to "Apple" or the like.

When the job on which the processing executor 26 has executed the particular processing is stored in the first custom box 19a of the first image forming apparatus 1A as a destination to store specified by the destination-to-store specifier 23 of the second image forming apparatus 1B, the signal output device 27 outputs a completion signal indicating the completion of storage of the job to the second image forming apparatus 1B.

The display device 12B of the second image forming apparatus 1B displays (indicates), based on the completion signal from the signal output device 27 of the first image forming apparatus 1A, that the job on which the processing executor 26 has executed the particular processing is stored in the second custom box 19a of the first image forming apparatus 1A as a destination to store specified by the destination-to-store specifier 23. The display device 12B of the second image forming apparatus 1B is an example of an indicator defined in What is claimed is.

Figure 4:
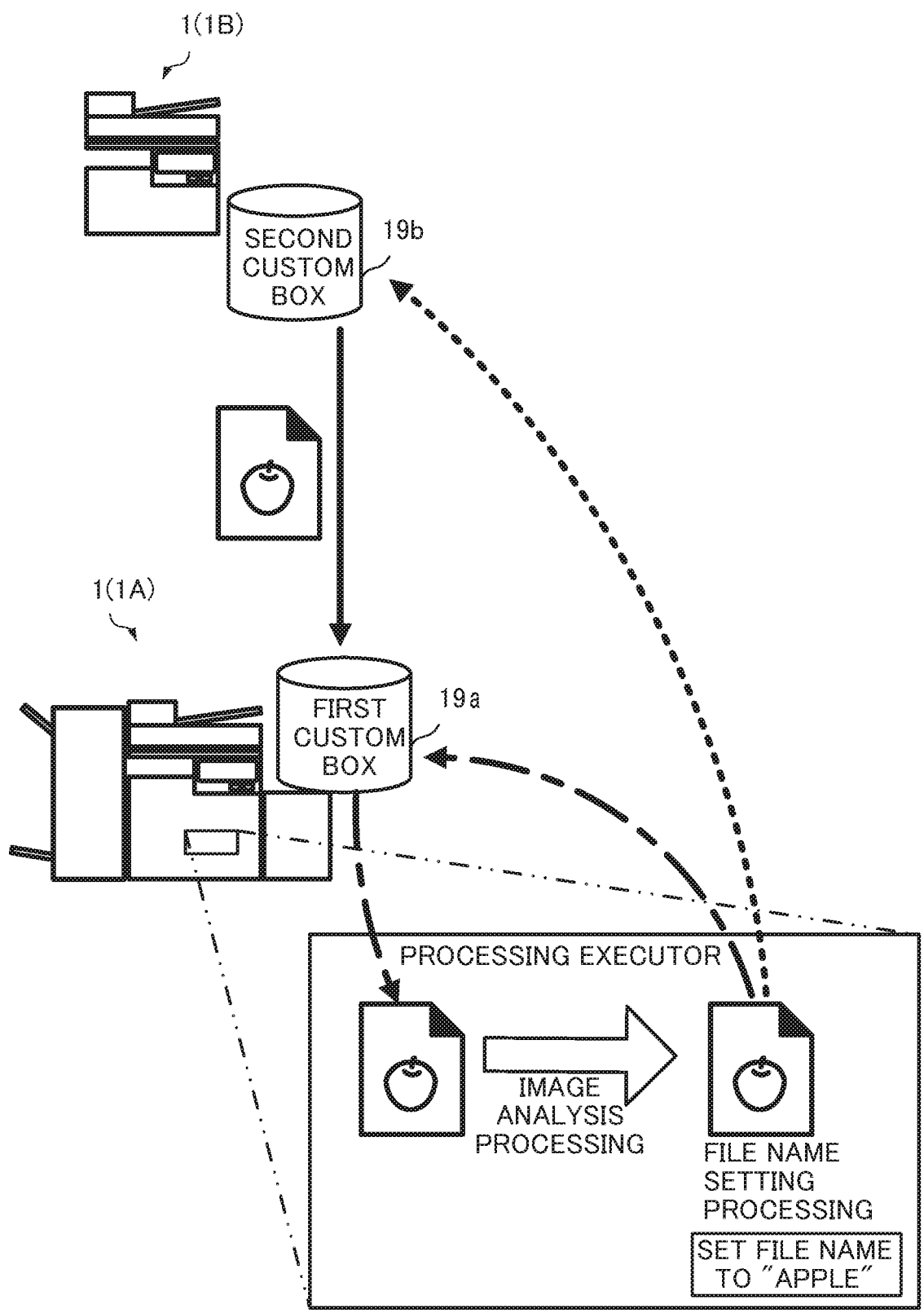
FIG. 4 is a diagram showing a flow in which, on a first image forming apparatus of the image forming system according to the first embodiment, particular processing is executed on a job sent from the second image forming apparatus of the image forming system and the job is then stored into a specified destination to store.

FIG. 4 is a diagram showing a flow in which on the first image forming apparatus particular processing is executed on a job from the second image forming apparatus and the job is then stored in a specified destination to store. As shown in FIG. 4, the image forming system 100 according to the first embodiment enables remote processing for setting particular processing of the first image forming apparatus 1A to shared processing and executing, on the first image forming apparatus 1A, the particular processing on a job of the second image forming apparatus 1B.

Specifically, the image forming system 100 enables remote processing in which a job stored in the second custom box 19b of the second image forming apparatus 1B is transmitted to the first custom box 19a of the first image forming apparatus 1A, particular processing is executed on the job in the first custom box 19a on the first image forming apparatus 1A, and the job on which the particular processing has been executed is stored in the first custom box 19a of the first image forming apparatus 1A or the second custom box 19b of the second image forming apparatus 1B.

A description will be given below of the setting of the particular processing of the first image forming apparatus 1A to shared processing. FIG. 5A is a flowchart showing an example of processing for registering a share program on the first image forming apparatus. FIG. 5B is a view showing an example of a display screen on the display device of the first image forming apparatus. FIG. 5C is a view showing another example of a display screen on the display device of the first image forming apparatus.

The controller 21A of the first image forming apparatus 1A determines, with a display screen shown in FIG. 5B being displayed on the display device 12A, whether or not a Share Setting button has been pressed (S1). When a user presses a key K1 indicating "Share Setting" (YES in S1), the controller 21A starts share setting processing shown in FIG. 5A. Specifically, when the user presses the key K1, the touch panel 15A accepts the pressing of the key K1 and outputs a start signal for share setting processing to the controller 21A. The controller 21A allows the share setting processing to be started based on the start signal for share setting processing sent from the touch panel 15A.

The controller 21A of the first image forming apparatus 1A accesses the first custom box 19a (S2). The first custom box 19a holds a plurality of types of particular processing possessed by the first image forming apparatus 1A only, in other words, not possessed by the second image forming apparatus 1B, and the controller 21A reads the plurality of types of particular processing from the first custom box 19a and makes a list of them.

The controller 21A of the first image forming apparatus 1A allows the display device 12A of the first image forming apparatus 1A to display the list of the plurality of types of particular processing read from the first custom box 19a. Then, the user or an administrator makes a touch gesture on one or more of items indicating the plurality of types of particular processing in the list displayed on the display device 12A of the first image forming apparatus 1A, thus selecting a single or plurality of types of particular processing to be set to share them. For example, as shown in FIG. 5C, an item K2 indicating a first share program for executing first particular processing, an item K3 indicating a second share program for executing second particular processing, and an item K4 indicating a third share program for executing third particular processing are selected as types of particular processing to be set to share them.

When an OK key K5 is pressed, the controller 21A of the first image forming apparatus 1A registers the first share program, the second share program, and the third share program as share programs with the first custom box 19a. Then, the controller 21A of the first image forming apparatus 1A ends this processing.

Next, a description will be given of processing on the second image forming apparatus 1B. FIG. 6A is a flowchart showing an example of scanning processing on the second image forming apparatus. FIG. 6B is a view showing an example of a display screen on the display device of the second image forming apparatus.

As shown in FIG. 6A, when the user places an original document in the image reading device 17B of the second image forming apparatus 1B and, in this state, a key K11 indicating "Scan" displayed on the display device 12B shown in FIG. 6B is pressed (YES in S11), the controller 21B of the second image forming apparatus 1B allows the image reading device 17B of the second image forming apparatus 1B to read the original document and allows the second custom box 19b to store scanned data representing an image of the original document read by the image reading device 17B (S12). Then, the controller 21B of the second image forming apparatus 1B ends this processing.

Figure 7A:
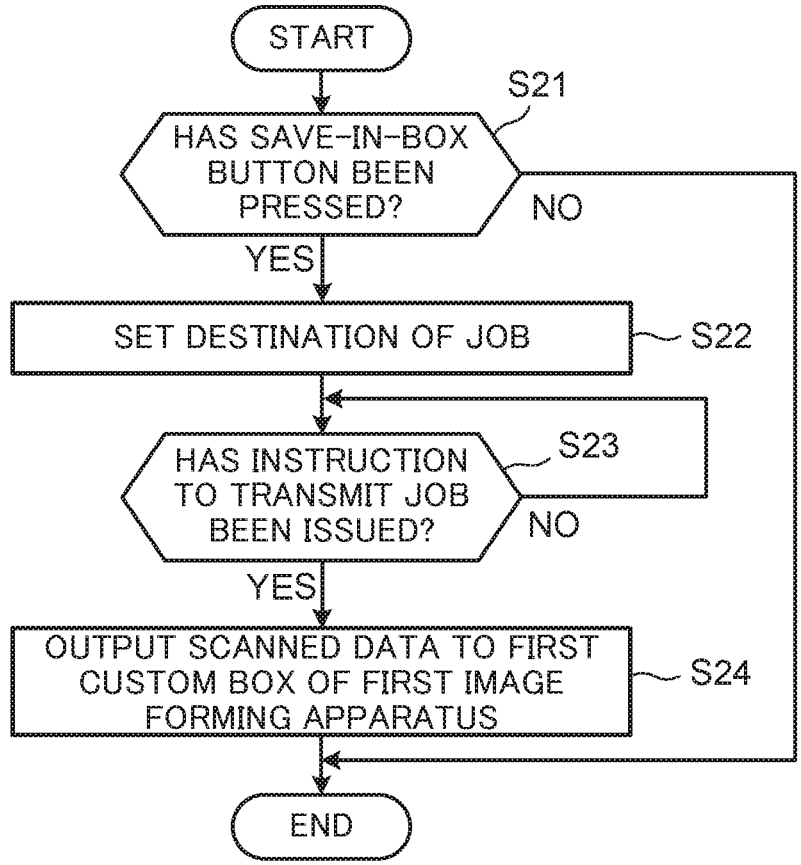
FIG. 7A is a flowchart showing an example of store-in-box processing on the second image forming apparatus.
Figure 7B:
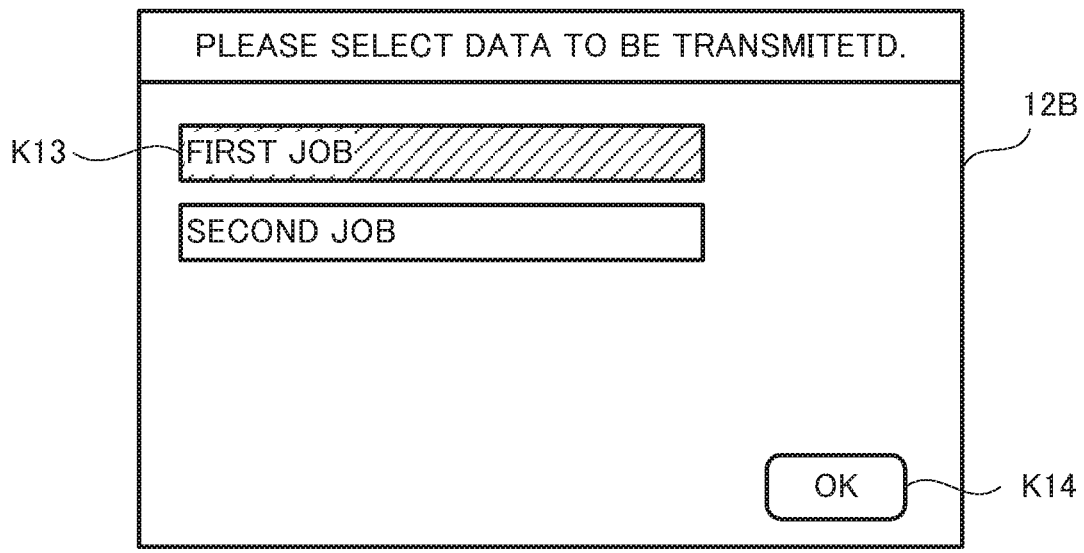
FIG. 7B is a view showing an example of a display screen on the display device of the second image forming apparatus.

FIG. 7A is a flowchart showing an example of store-in-box processing on the second image forming apparatus. FIG. 7B is a view showing an example of a display screen on the display device of the second image forming apparatus.

As shown in FIG. 7A, when a key K12 indicating "Store in Box" displayed on the display device 12B shown in FIG. 6B is pressed (YES in S21), the controller 21B of the second image forming apparatus 1B allows the display device 12B to display a display screen shown in FIG. 7B. On the display screen shown in FIG. 7B, a first job and a second job both previously stored in the second custom box 19b are displayed. The first job is a job on the above-mentioned scanned data. Then, when the user makes a touch gesture on an item K13 indicating the first job displayed on the display device 12B, the touch panel 15B detects that the first job has been selected and the controller 21B recognizes that the first job has been selected.

Then, when the user presses an OK key K14 on the display screen shown in FIG. 7B, the controller 21B of the second image forming apparatus 1B allows the display device 12B to display a display screen shown in FIG. 8A. FIG. 8A is a view showing an example of a display screen on the display device of the second image forming apparatus. As shown in FIG. 8A, the controller 21B of the second image forming apparatus 1B has already acquired, through the communication device 16B, information on the three image forming apparatuses (i.e., a single first image forming apparatus 1A and two second image forming apparatuses 1B) connected via the network N and respective IP addresses assigned to these image forming apparatuses, and allows the display device 12B to display the information. Alternatively, the controller 21B may allow the display device 12B to display only information on the first image forming apparatus 1A and its IP address. Then, when the user makes a touch gesture on an item K15 indicating the first image forming apparatus 1A displayed on the display device 12B and the touch panel 15B detects the touch gesture on the item K15, the controller 21B sets the first image forming apparatus 1A as a destination of the first job (the scanned data) (S22).

When an OK key K16 shown in FIG. 8 is pressed, the controller 21B of the second image forming apparatus 1B allows the display device 12B to display a display screen shown in FIG. 8B. FIG. 8B is a view showing another example of a display screen on the display device of the second image forming apparatus. The display screen shown in FIG. 8B is a screen for selecting a destination to store in the first image forming apparatus 1A and, on the display screen, "FIRST CUSTOM BOX" 19a and "ANOTHER CUSTOM BOX" are displayed.

Then, when the user makes a touch gesture on an item K17 indicating the first custom box 19a displayed on the display device 12B, the touch panel 15B detects that the first custom box 19a has been selected and the controller 21B recognizes that the first custom box 19a has been selected. When a Send key K18 is pressed (YES in S23), the controller 21B of the second image forming apparatus 1B outputs the scanned data through the communication device 16B to the first custom box 19A of the first image forming apparatus 1A (S24). When not given an instruction to send the scanned data (NO in S23), the controller 21B of the second image forming apparatus 1B allows the processing to return to S23 and waits for receipt of the instruction to send the scanned data.

After the processing step in S24, the controller 21B of the second image forming apparatus 1B ends this processing.

Figure 9:
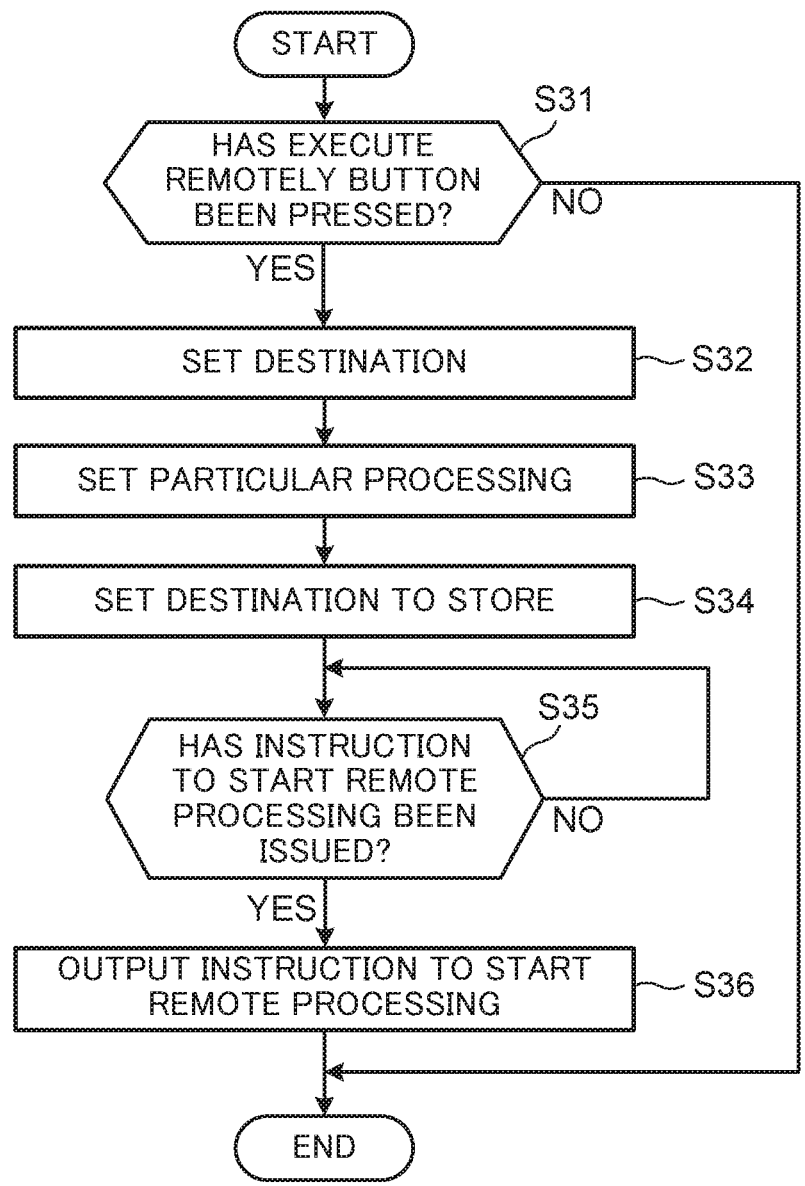
FIG. 9 is a flowchart showing an example of remote setting processing on the second image forming apparatus.

Subsequently, a description will be given of remote setting processing on the second image forming apparatus. FIG. 9 is a flowchart showing an example of remote setting processing on the second image forming apparatus. FIG. 10A is a view showing an example of a display screen on the display device of the second image forming apparatus. FIG. 10B is a view showing another example of a display screen on the display device of the second image forming apparatus.

When a key K21 indicating "Execute Remotely" displayed on the display device 12B shown in FIG. 10A is pressed (YES in S31), the controller 21B of the second image forming apparatus 1B allows the display device 12B to display a display screen shown in FIG. 10B. As shown in FIG. 10B, the controller 21B of the second image forming apparatus 1B has already acquired, through the communication device 16B, a list of remotely operable apparatuses and allows the display device 12B to display the list. Although in this example the controller 21B allows the display device 12B to display a single first image forming apparatus 1A and two second image forming apparatuses 1B, the controller 21B may allow the display device 12B to display the first image forming apparatus 1A only. Then, when the user makes a touch gesture on an item K22 indicating the first image forming apparatus 1A displayed on the display device 12B, the controller 21B sets the first image forming apparatus 1A as an apparatus to be operated remotely (S32).

Then, when an OK key K23 shown in FIG. 10B is pressed, the controller 21B of the second image forming apparatus 1B allows the display device 12B to display a display screen shown in FIG. 11A. FIG. 11A is a view showing an example of a display screen on the display device of the second image forming apparatus. The controller 21B of the second image forming apparatus 1B has already acquired, through the communication device 16B from the first image forming apparatus 1A, a list of share programs previously registered with the first custom box 19a by the register 25 of the first image forming apparatus 1A. Therefore, as shown in FIG. 11A, the controller 21B allows the display device 12B to display respective items indicating the first particular processing, the second particular processing, and the third particular processing as a list of types of particular processing (the list of share programs) in the first image forming apparatus 1A.

When the user makes a touch gesture on an item K24 indicating the first particular processing displayed on the display device 12B, the touch panel 15B detects that the first particular processing has been selected and the controller 21B sets the first particular processing as particular processing to be executed (S33).

Subsequently, when an OK key K25 shown in FIG. 11A is pressed, the controller 21B of the second image forming apparatus 1B allows the display device 12B to display a display screen shown in FIG. 11B. FIG. 11B is a view showing another example of a display screen on the display device of the second image forming apparatus. The display screen shown in FIG. 11B is a screen for selecting a destination to store the job on which the particular processing has been executed.

When the user makes a touch gesture on an item K26 indicating the first image forming apparatus 1A displayed on the display device 12B, the controller 21B specifies the first image forming apparatus 1A as a destination to store the job on which the particular processing has been executed (S34).

Figure 12A:
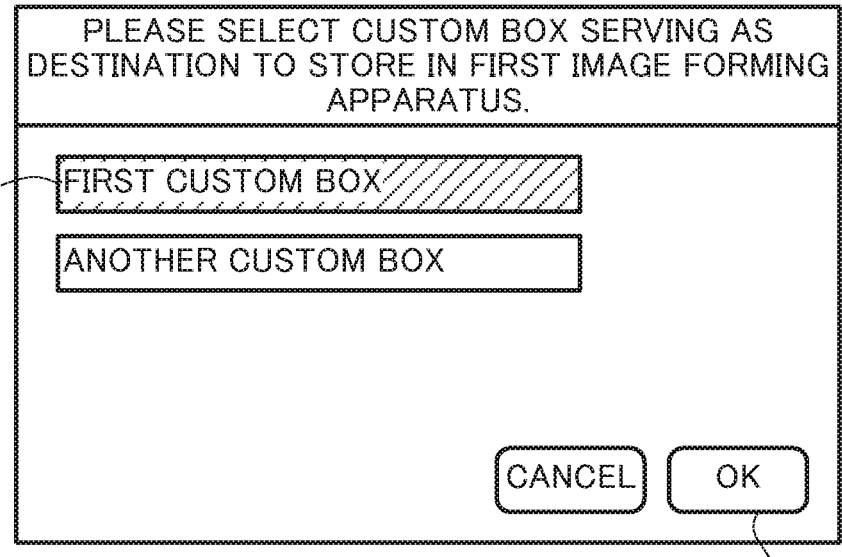
FIG. 12A is a view showing an example of a display screen on the display device of the second image forming apparatus.

When an OK key K27 shown in FIG. 11B is pressed, the controller 21B of the second image forming apparatus 1B allows the display device 12B to display a display screen shown in FIG. 12A. FIG. 12A is a view showing an example of a display screen on the display device of the second image forming apparatus. The display screen shown in FIG. 12A is a screen for selecting a destination to store in the first image forming apparatus 1A and, on the display screen, "FIRST CUSTOM BOX" 19a and "ANOTHER CUSTOM BOX" are displayed.

When the user makes a touch gesture on an item K28 indicating the first custom box 19a displayed on the display device 12B, the touch panel 15B detects that the first custom box 19a has been selected and the controller 21B recognizes that the first custom box 19a has been selected. When an OK key K29 is pressed, the controller 21B of the second image forming apparatus 1B allows the display device 12B to display a display screen shown in FIG. 12B.

Figure 12B:
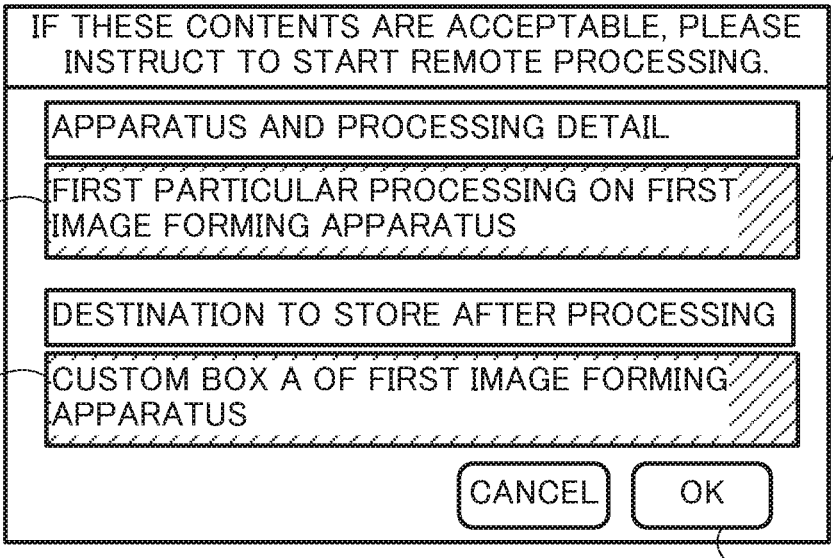
FIG. 12B is a view showing another example of a display screen on the display device of the second image forming apparatus.

The display screen shown in FIG. 12B displays: an item K31 indicating that the target apparatus and the processing detail are the first image forming apparatus 1A and the first particular processing thereon, respectively; and an item K32 indicating that the destination to store after the processing is the first custom box 19a of the first image forming apparatus 1A.

When an OK key K33 shown in FIG. 12B is pressed (YES in S35), the controller 21B of the second image forming apparatus 1B outputs an instruction to start remote processing through the communication device 16B to the first image forming apparatus 1A (S36). This instruction to start remote processing contains instruction information indicating that the target apparatus and the processing detail are the first image forming apparatus 1A and the first particular processing thereon, respectively, and that the destination to store after the processing is the first custom box 19a of the first image forming apparatus 1A. When not given an instruction to start remote processing (NO in S35), the controller 21B of the second image forming apparatus 1B allows the processing to return to S35 and waits for receipt of the instruction to start remote processing.

Then, after the processing step in S36 or when the key K21 indicating "Execute Remotely" has not been pressed (NO in S31), the controller 21B of the second image forming apparatus 1B ends this processing.

Figure 13:
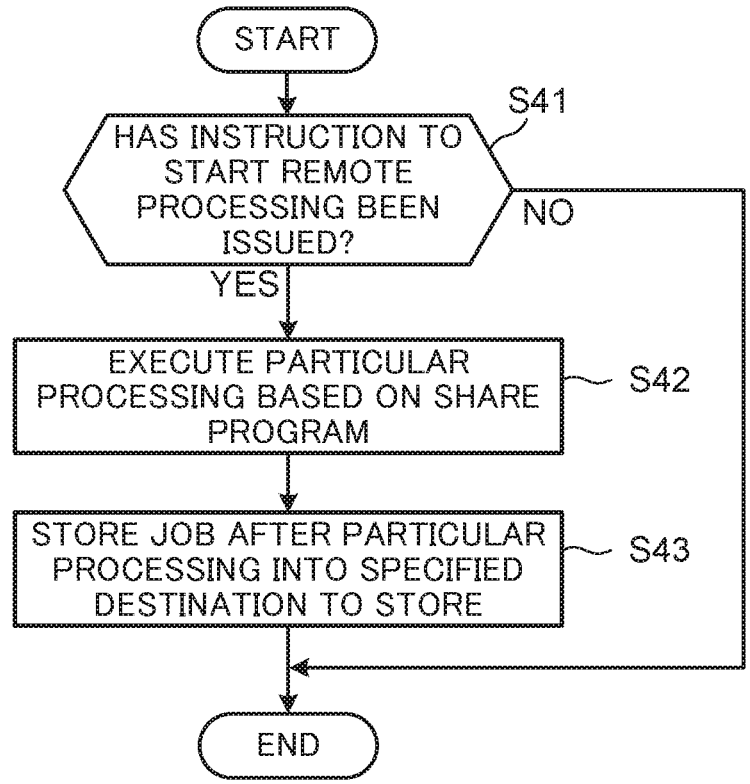
FIG. 13 is a flowchart showing an example of remote processing on the first image forming apparatus.

Next, a description will be given of remote processing on the first image forming apparatus 1A. FIG. 13 is a flowchart showing an example of remote processing on the first image forming apparatus.

When the communication device 16A receives the instruction to start remote processing from the second image forming apparatus 1B (YES in S41), the controller 21A of the first image forming apparatus 1A identifies the instruction to start remote processing. Specifically, the controller 21A identifies that the contents of the instruction to start remote processing are: that the target apparatus and the processing detail are the first image forming apparatus 1A and the first particular processing thereon, respectively; and that the destination to store after the processing is the first custom box 19a of the first image forming apparatus 1A.

Then, the controller 21A of the first image forming apparatus 1A allows the processing executor 26 to execute, as particular processing based on a share program, the first particular processing on the first job (scanned data) stored in the first custom box 19a (S42). For example, the first particular processing contains image analysis processing and file name setting processing. Therefore, the processing executor 26 executes image analysis processing on the first job (scanned data) and then executes file name setting processing according to the result of the image analysis processing: for example, when in the first embodiment the content of image data of the first job is a text describing an apple or apples or the image data of the first job is a picture of an apple or apples, the processing executor 26 executes file name setting processing for setting the file name to "Apple".

Then, the controller 21A of the first image forming apparatus 1A allows the first custom box 19a of the first image forming apparatus 1A, which is a specified destination to store, to store the first job (scanned data) on which the first particular processing has been executed, i.e., the first job (scanned data) the file name of which has been set to "Apple" (S43).

Then, the controller 21A of the first image forming apparatus 1A ends this processing.

The above-described image forming system 100 according to the first embodiment includes a first image forming apparatus 1A capable of executing particular processing and second image forming apparatuses 1B incapable of executing the particular processing. The first image forming apparatus 1A includes a register 25 and a first custom box 19a. The register 25 registers a program for executing the particular processing as a share program. The first custom box 19a stores a job transmitted from the second image forming apparatus 1B. The second image forming apparatus 1B includes a display device 12B, a communication device 16B, a remote instructor 22, and a processing executor 26. The communication device 16B transmits, according to a user's operation on the display device 12B, the job to the first custom box 19a of the first image forming apparatus 1A. The remote instructor 22 gives, according to a user's operation on the display device 12B, an instruction to the first image forming apparatus 1A to start processing based on the share program. When receiving the instruction to start processing from the remote instructor 22, the processing executor 26 of the first image forming apparatus 1A executes, on the job stored in the first custom box 19a, the particular processing based on the share program. Thus, the particular processing possessed by the first image forming apparatus 1A only (for example, a performance or function possessed by a higher-level apparatus only) can be utilized by the second image forming apparatus 1B (for example, a lower-level apparatus).

In large offices, an image forming system is established where a plurality of image forming apparatuses are connected via a network. Image forming apparatuses include higher-level apparatuses (high-end models) and lower-level apparatuses (low-end models). The higher-level apparatuses have high performance and high functionality, but are very expensive. On the other hand, the lower-level apparatuses are less expensive and have lower performance and lower functionality than the higher-level apparatuses. In the above image forming system, only one higher-level apparatus is used and the others are lower-level apparatuses because the system will be very expensive if all the image forming apparatuses are higher-level ones.

If all the users in the system use the higher-level apparatus, an excessive amount of jobs are assigned to the higher-level apparatus, so that a job waiting time increases. Furthermore, the higher-level apparatus may also be assigned processing similar to that assigned to the lower-level apparatuses. If it is possible that the higher-level apparatus executes only processing executable by the higher-level apparatus only and the lower-level apparatuses execute processing executable even by themselves, the operating efficiency will be improved. However, under existing circumstances, such a solution has not yet been found.

In the general image forming system described in BACKGROUND above, all the image forming apparatuses have parallel printing function, so that parallel printing can be performed among the plurality of image forming apparatuses. However, the above function is nothing more than execution of processing by cooperation among a plurality of models having the same function and the above image forming system is not configured so that particular processing possessed by a higher-level apparatus only (for example, a performance or function possessed by the higher-level apparatus only) is utilized by lower-level apparatuses.

In contrast, in this embodiment, particular processing possessed by the higher-level apparatus only can be utilized by the lower-level apparatuses.

Furthermore, the destination-to-store specifier 23 specifies, according to a user's operation on the display device 12B, the first custom box 19a of the first image forming apparatus 1A or the second custom box 19b of the second image forming apparatus 1B as a destination to store a job on which the processing executor 26 of the first image forming apparatus 1A has executed the particular processing. Thus, when the destination to store the job is specified to the first custom box 19a, the job on which particular processing possessed by the first image forming apparatus 1A only has been executed can be saved together with other jobs in the first custom box 19a of the first image forming apparatus 1A. On the other hand, when the destination to store the job is specified to the second custom box 19b, the job on which particular processing possessed by the first image forming apparatus 1A only has been executed can be returned to and saved in the second custom box 19b of the second image forming apparatus 1B.

When the job on which the processing executor 26 of the first image forming apparatus 1A has executed the particular processing is stored in the second custom box 19b of the second image forming apparatus 1B as a destination to store specified by the destination-to-store specifier 23, the display device 12B of the second image forming apparatus 1B displays (indicates) that the job is stored in the second custom box 19b. Thus, the user can recognize, from the display (indication) of the display device 12B, that the job on which the particular processing has been executed is stored in the second custom box 19b of the second image forming apparatus 1B, can save from the second custom box 19b into the first custom box 19a of the first image forming apparatus 1A the job on which particular processing possessed by only the first image forming apparatus 1A capable of extracting the job after execution of the particular processing (for example, a performance or function possessed by a higher-level apparatus only) has been executed, together with other jobs, and can return to and save in the second custom box 19b of the second image forming apparatus 1B the job on which the particular processing has been executed.

On the other hand, when the job on which the processing executor 26 of the first image forming apparatus 1A has executed the particular processing is stored in the first custom box 19a of the first image forming apparatus 1A as a destination to store specified by the destination-to-store specifier 23, the signal output device 27 of the first image forming apparatus 1A outputs a completion signal indicating the completion of storage of the job to the second image forming apparatus 1B. The display device 12B of the second image forming apparatus 1B displays (indicates), based on the completion signal from the signal output device 27 of the first image forming apparatus 1A, that the above job is stored in the second custom box 19a of the first image forming apparatus 1A. Thus, the user can recognize, from the display (indication) of the display device 12B of the second image forming apparatus 1B, that the job on which particular processing possessed by the first image forming apparatus 1A only (for example, a performance or function possessed by a higher-level apparatus only) has been executed is stored in the first custom box 19a of the first image forming apparatus 1A. In addition, the job can be saved together with other jobs in the first custom box 19a of the first image forming apparatus 1A.

Furthermore, the register 25 registers a program for executing image analysis processing and file name setting processing as a share program. Thus, on a job accepted by the second image forming apparatus 1B (for example, a lower-level apparatus), particular processing possessed by the first image forming apparatus 1A only (for example, image analysis processing and file name setting processing both possessed by a higher-level apparatus only) can be executed. In other words, the particular processing possessed by the first image forming apparatus 1A only can be utilized by the second image forming apparatus 1B.

Figure 14:
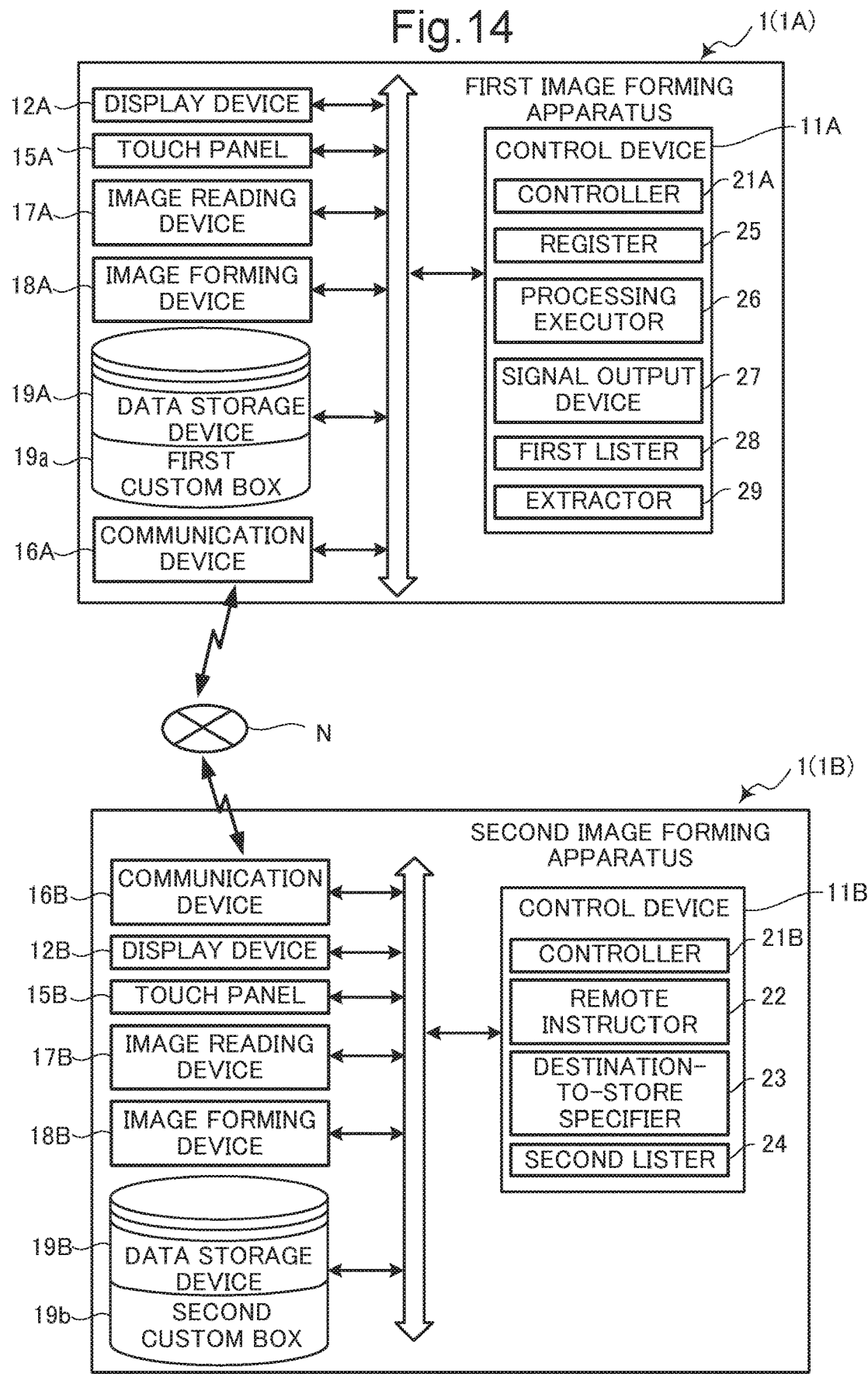
FIG. 14 is a block diagram showing the configuration of an image forming system according to the second embodiment.

Next, a description will be given of an image forming system 100 according to a second embodiment with reference to FIG. 14. FIG. 14 is a block diagram showing the configuration of an image forming system according to the second embodiment. The image forming system 100 according to the second embodiment is different from the image forming system according to the first embodiment in that the first image forming apparatus 1A includes a first lister 28 and an extractor 29 and the second image forming apparatus 1B includes a second lister 24. The same components as those described in the first embodiment are designated by the same reference numerals and further explanation thereof is omitted.

The first lister 28 of the first image forming apparatus 1A makes a list of a plurality of types of processing possessed by the first image forming apparatus 1A. For example, the data storage device 19A of the first image forming apparatus 1A previously stores a plurality of types of processing possessed by the first image forming apparatus 1A and the first lister 28 makes a list of the plurality of types of processing possessed by the first image forming apparatus 1A by reading out the plurality of types of processing previously stored in the data storage device 19A.

The second lister 24 of the second image forming apparatus 1B makes a list of a plurality of types of processing possessed by the second image forming apparatus 1B. For example, the data storage device 19B of the second image forming apparatus 1B previously stores a plurality of types of processing possessed by the second image forming apparatus 1B and the second lister 24 makes a list of the plurality of types of processing possessed by the second image forming apparatus 1B by reading out the plurality of types of processing previously stored in the data storage device 19B.

The communication device 16B of the second image forming apparatus 1B transmits to the first image forming apparatus 1A the list of the plurality of types of processing possessed by the second image forming apparatus 1B, the list having been made by the second lister 24.

The extractor 29 of the first image forming apparatus 1A extracts as particular processing, from the list of the plurality of types of processing made by the first lister 28, one or more types of processing not contained in the list of the plurality of types of processing possessed by the second image forming apparatus 1B, the latter list having been transmitted from the communication device 16b of the second image forming apparatus 1B. In short, the extractor 29 of the first image forming apparatus 1A extracts as particular processing, from the list of the plurality of types of processing made by the first lister 28, one or more types of processing not contained in the list of the plurality of types of processing made by the second lister 24.

The register 25 of the first image forming apparatus 1A registers as a share program a program for executing each of the one or more types of particular processing extracted by the extractor 29.

The above image forming system 100 according to the second embodiment can extract, as particular processing, one or more types of processing possessed by the first image forming apparatus 1A only. Therefore, the user does not need to perform an operation for determining which of a plurality of types of processing possessed by the first image forming apparatus 1A is particular processing and an operation for setting one or more of the plurality of types of processing as particular processing, so that the user's work burden can be reduced. The user can easily select particular processing extracted by the extractor 29 of the first image forming apparatus 1A.

A description will be given below of a modification of the image forming system 100 according to the first embodiment. The following description of the modification of the image forming system 100 relates to the case where the register 25 registers as a share program, according to a user's touch gesture on the display device 12A, a program for executing processing for providing a teaching assistant function, i.e., a help function, which is third particular processing, with the first custom box 19a.

The communication device 16B of the second image forming apparatus 1B transmits to the first image forming apparatus 1A a request signal requesting to send the contents of the teaching assistant function. The control device 11A of the first image forming apparatus 1A generates, in response to the request signal from the second image forming apparatus 1B, data on the teaching assistant function and allows the communication device 16A to transmit the generated data on the teaching assistant function to the second image forming apparatus 1B. The control device 11B of the second image forming apparatus 1B allows the display device 12B to display the received data on the teaching assistant function.

In the above modification, since the second image forming apparatus 1B not possessing the teaching assistant function receives the data on the teaching assistant function from the first image forming apparatus 1A possessing the teaching assistant function, the teaching assistant function can be offered to the user on the second image forming apparatus 1B.

The structures, configurations, and processing described in the above embodiments with reference to FIGS. 1 to 14 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. An image forming system comprising a plurality of image forming apparatuses connected via a network,
   the plurality of image forming apparatuses include a first image forming apparatus capable of executing particular processing and a second image forming apparatus incapable of executing the particular processing,
   the first image forming apparatus comprising:
   a first custom box that stores a job transmitted from the second image forming apparatus; and
   a first control device including a processor and functioning, through the processor executing a first control program, as a register that registers as a share program a program for executing the particular processing,
   the second image forming apparatus comprising:
   an operation device;
   a transmitter that transmits, according to a user's operation on the operation device, the job to the first custom box of the first image forming apparatus; and
   a second control device including a processor and functioning, through the processor executing a second control program, as a remote instructor that gives, according to a user's operation on the operation device, an instruction to the first image forming apparatus to start processing based on the share program,
   the first control device of the first image forming apparatus further functioning, through the processor executing the first control program, as a processing executor that, upon receipt of the instruction to start processing from the remote instructor, executes the particular processing based on the share program on the job stored in the first custom box.

2. The image forming system according to claim 1, wherein
   the second image forming apparatus further comprises a second custom box that stores the job, and
   the second control device further functions, through the processor executing the second control program, as a destination-to-store specifier that specifies, according to a user's operation on the operation device, the first custom box of the first image forming apparatus or the second custom box of the second image forming apparatus as a destination to store the job on which the processing executor of the first image forming apparatus has executed the particular processing.

3. The image forming system according to claim 2, wherein the second image forming apparatus further comprises an indicator that indicates, when the job on which the processing executor of the first image forming apparatus has executed the particular processing is stored in the second custom box of the second image forming apparatus as a destination to store specified by the destination-to-store specifier, that the job is stored in the second custom box.

4. The image forming system according to claim 3, wherein
   the first control device of the first image forming apparatus further functions, through the processor executing the first control program, as a signal output device that outputs, when the job on which the processing executor of the first image forming apparatus has executed the particular processing is stored in the first custom box of the first image forming apparatus as a destination to store specified by the destination-to-store specifier, a completion signal indicating completion of storage of the job to the second image forming apparatus, and
   the indicator of the second image forming apparatus indicates, based on the completion signal from the signal output device of the first image forming apparatus, that the job is stored in the first custom box of the first image forming apparatus.

5. The image forming system according to claim 1, wherein
   the particular processing includes: image analysis processing for subjecting image data on the job stored in the first custom box to a predetermined image analysis; and file name setting processing for setting a file name according to a result of the image analysis processing for the image data on the job, and
   the register registers a program for executing the image analysis processing and the file name setting processing as the share program.

6. The image forming system according to claim 1, wherein
   the first control device of the first image forming apparatus further functions, through the processor executing the first control program, as a first lister that makes a list of a plurality of types of processing possessed by the first image forming apparatus,
   the second control device of the second image forming apparatus further functions, through the processor executing the second control program, as a second lister that makes a list of a plurality of types of processing possessed by the second image forming apparatus,
   the transmitter of the second image forming apparatus transmits the list of the plurality of types of processing possessed by the second image forming apparatus, the list having been made by the second lister, to the first image forming apparatus,
   the first control device of the first image forming apparatus further functions, through the processor executing the first control program, as an extractor that extracts as the particular processing, from the list of the plurality of types of processing made by the first lister, processing out of the list of the plurality of types of processing possessed by the second image forming apparatus, the list having been transmitted from the transmitter of the second image forming apparatus, and
   the register of the first image forming apparatus registers as the share program the program for executing the particular processing extracted by the extractor.

7. The image forming system according to claim 1, wherein
   the particular processing includes processing for providing a teaching assistant function,
   the register registers as the share program a program for executing the processing for providing the teaching assistant function,
   the second image forming apparatus transmits, according to a user's operation on the operation device, a request signal requesting to send contents of the teaching assistant function to the first image forming apparatus,
   in response to the request signal from the second image forming apparatus, the first control device of the first image forming apparatus generates data on the teaching assistant function and transmits the generated data on the teaching assistant function to the second image forming apparatus, and
   the second image forming apparatus further comprises a display device and allows the display device to display the received data on the teaching assistant function.

* * * * *